(12) United States Patent
McKenna et al.

(10) Patent No.: US 7,504,937 B2
(45) Date of Patent: Mar. 17, 2009

(54) SELF-CONFIGURING EMERGENCY EVENT ALARM NETWORK

(75) Inventors: John Daniel McKenna, Vail, CO (US); Daniel Bernard McKenna, Vail, CO (US); James Michael Graziano, Hotchkiss, CO (US)

(73) Assignee: SelfLink LLC, Vail, CO (US)

( * ) Notice: Subject to any disclaimer, the term of this patent is extended or adjusted under 35 U.S.C. 154(b) by 0 days.

(21) Appl. No.: 11/872,005

(22) Filed: Oct. 13, 2007

(65) Prior Publication Data

US 2008/0030319 A1   Feb. 7, 2008

Related U.S. Application Data

(63) Continuation of application No. 11/231,400, filed on Sep. 20, 2005, now Pat. No. 7,301,455.

(51) Int. Cl.
*G08B 29/00* (2006.01)
(52) U.S. Cl. ............... 340/506; 340/540; 340/539.16
(58) Field of Classification Search ............ 340/506, 340/540, 521, 539.16, 539.17, 539.18, 539.19, 340/870.03, 870.16; 700/108
See application file for complete search history.

(56) References Cited

U.S. PATENT DOCUMENTS

| | | | |
|---|---|---|---|
| 6,437,692 | B1 | 8/2002 | Petite et al. |
| 6,987,448 | B2 | 1/2006 | Catton et al. |
| 7,053,770 | B2 | 5/2006 | Ratiu et al. |
| 7,091,902 | B2 | 8/2006 | Liu et al. |
| 7,113,090 | B1 | 9/2006 | Saylor et al. |
| 7,145,467 | B2 | 12/2006 | Abel et al. |
| 7,187,279 | B2 | 3/2007 | Chung |
| 7,301,455 | B2 * | 11/2007 | McKenna et al. ........... 340/540 |

* cited by examiner

*Primary Examiner*—John A Tweel, Jr.
(74) *Attorney, Agent, or Firm*—Patton Boggs LLP

(57) ABSTRACT

The present self-configuring alarm network uses a decentralized (ad hoc or mesh) architecture that does not have a centralized "master" node. In this ad hoc network, any node is capable of behaving as if it were the "master node" by autonomously reporting the alarm event directly to all other nodes in the ad hoc network independent of where the alarm event occurred. The network of alarm devices, therefore, can spread the alarm indication to the entirety of the area covered by the network of alarm devices and can also differentiate between a general alarm indication and the locus of the alarm event.

52 Claims, 8 Drawing Sheets

Figure 1 – Prior Art

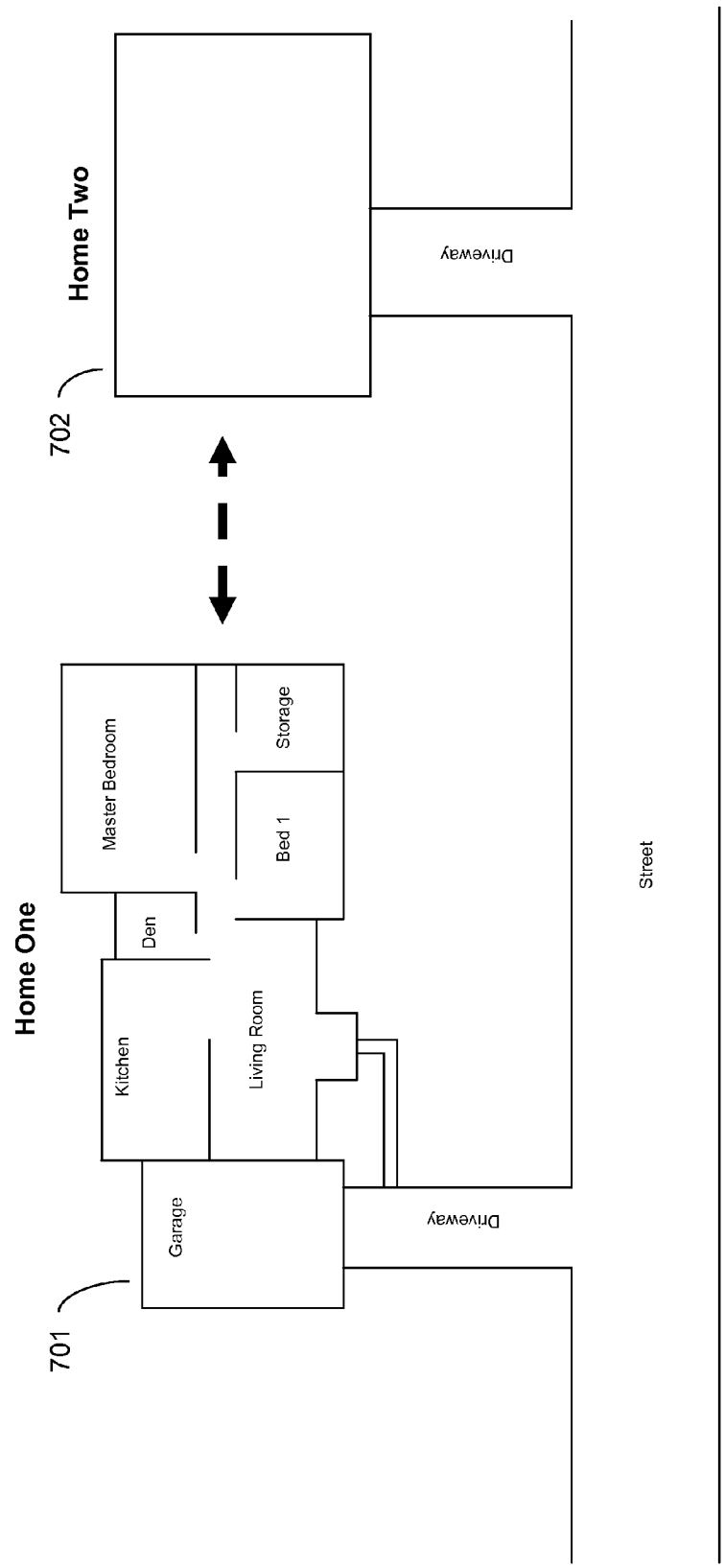

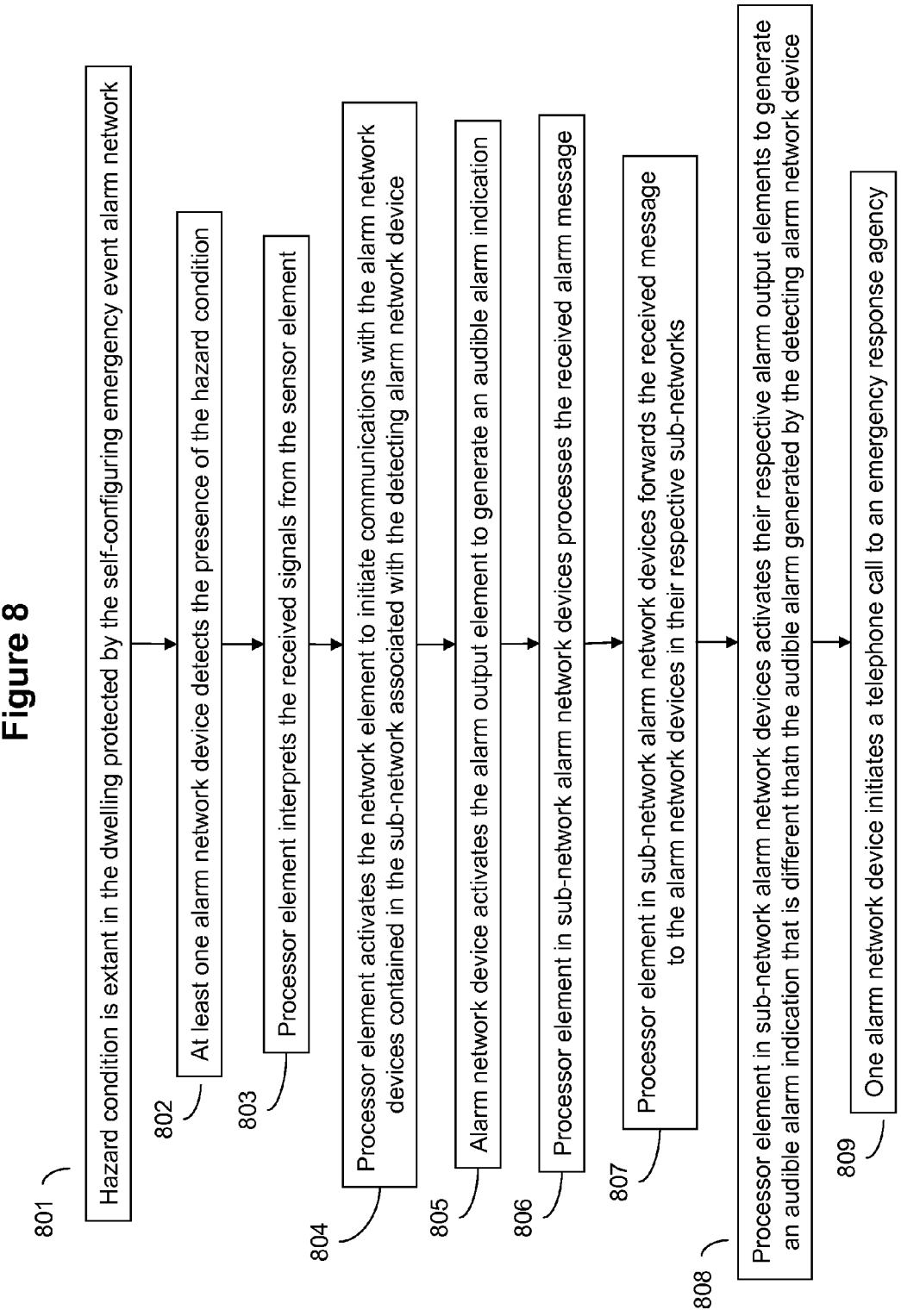

SELF-CONFIGURING EMERGENCY EVENT ALARM NETWORK

CROSS-REFERENCE TO RELATED APPLICATIONS

This application is a Continuation of U.S. application Ser. No. 11/231,400 filed on Sep. 20, 2005, now U.S. Pat. No. 7,301,455 issued Nov. 27, 2007.

FIELD OF THE INVENTION

This invention relates to alarm devices that are located in fixed locations within a dwelling and are used to identify the presence and locus of a hazard to the occupants of the dwelling.

BACKGROUND OF THE INVENTION

It is a problem in the field of alarm devices that there are numerous hazards that can be threatening to the occupants of a dwelling, and existing hazard detection sensors are available to detect the presence of a predetermined level, concentration, or intensity of the hazard. Autonomous alarm devices are located in fixed locations within a dwelling and respond to the incorporated hazard sensor to automatically generate an alarm indication, such as an audible alarm, to identify the presence of a hazard proximate to the alarm device. However, the audible alarm only alerts the occupants of the dwelling who are presently located proximate to the active autonomous alarm device. Alternatively, integrated home protection systems output an audible alarm via all alarm devices located in a dwelling, but without providing any indication of the locus or nature of the detected hazard. Therefore, existing alarm devices and systems are limited in their effectiveness in alerting occupants of a dwelling and/or providing an identification of the nature and locus of the detected hazard.

Present integrated home protection systems are pre-wired into a dwelling and typically function both as a burglar alarm system and a hazard detection system. These integrated home protection systems use a centralized architecture comprising a master-slave topology to manage a plurality of remotely located sensors and a plurality of remotely located alarm devices that are located in a dwelling. The master-slave topology has all of the remote (slave) sensors reporting alarm events to the central control unit which then responds by audibly alarming ALL remote alarm devices in the system and, if so designed, sending an alarm indication to an external agency, such as the local fire department. However, the integrated home protection systems fail to provide an audible alarm that directs the occupants to the location of the hazard and/or provides an indication of the nature of the detected hazard.

If an integrated home protection system is not installed in the dwelling at the time of construction or remodel, the remaining protective solution is to purchase and install multiple stand-alone autonomous alarms that are placed in different locations in the dwelling garage, kitchen, bedrooms, and so on). However, these stand-alone alarms (fire, smoke, CO, natural gas), while alarming for an event in their immediate area/volume, do not alert other areas of the dwelling of a potential danger. Therefore, the occupants of the dwelling may not hear the alarm, and in multiple family dwellings, the occupants of units other than the one containing the active alarm are not likely to hear the active alarm.

Thus, presently available stand-alone alarm devices (consumer purchasable devices) operate autonomously since they have neither a master-slave topology (since no master exists) nor do they have an ad hoc or mesh networking ability to communicate with other peer-like alarm devices. In particular, the lack of any peer-to-peer alarm device communication capability causes the alarm system to only "alarm" in the area of the alarm event. This lack of systemic alarming capability means that large portions of a dwelling are not alerted to a given hazardous event and provide limited effectiveness due to their autonomous mode of operation and their reliance on local audible alarms to perform the alerting function.

Thus, there is a need for an emergency event alarm network that coordinates the operation of multiple alarm devices that are located throughout a dwelling or multiple units of a multi-family dwelling. In addition, there is a need for an emergency event alarm network that networks multiple alarm devices together without the need for extensive and expensive wiring to interconnect the alarm devices.

BRIEF SUMMARY OF THE INVENTION

The present self-configuring emergency event alarm network solves the above-described problems by dynamically interconnecting a set of individual alarm devices that are installed throughout a dwelling or the units of a multiple family dwelling as an ad hoc (or mesh) peer-to-peer network using a self-configuring network to effect the interconnection. The alarm devices described herein and termed "alarm network devices" herein consist of one or more sensor elements for detecting the presence of a hazard, a processor element for executing a set of control logic, an alarm element for generating an alert indication, and a network element for communicating with other alarm devices in the alarm network.

The self-configuring emergency event alarm network uses a decentralized (ad hoc or mesh) architecture that does not have a centralized "master" node. In this ad hoc network, any node is capable of behaving as if it were the "master node" by autonomously reporting the alarm event directly to all other nodes in the ad hoc network independent of where the alarm event occurred and then acting as the "master node" by reporting the event, if so configured, to an external response team such as the fire department or an alarm monitoring company. The network of alarm network devices, therefore, can spread the alarm indication to the entirety of the area covered by the network of alarm devices and also can differentiate between a general alarm indication and the locus of the alarm event. Thus, an alarm in the garage, which potentially would not be heard, is now heard throughout the house. In addition, the garage alarm can produce a different alarm indication, as the alarm network device detecting the hazard, than the remainder of the alarm network devices in the self-configuring emergency event alarm network to thereby indicate the locus of the alarm event. This "different alarm indication" could be a unique audible tone or it could be a synthesized or recorded voice prompt saying "garage" or it could be displayed as text on all of the network's alarm devices.

The connecting network between the alarm network devices could be acoustic, electrically wired, Radio Frequency (RF), optical, power line carrier, or a combination of multiple technologies to enable redundancy and simple installation. The preferred connective embodiment of the self-configuring emergency event alarm network is wireless or power line carrier since both are easily and immediately available to the non-expert, typical homeowner (by simply plugging in the alarm network device to an electrical outlet as is commonly done today with stand-alone alarms). In addition, multiple communication links can be used to provide redundancy, such as using the power line carrier as well as radio frequency links to interconnect the self-configuring emergency event alarm network devices.

This concept is not limited to a single family home but is extensible to other locations/uses. For example, in an apartment building, one apartment could alert the adjacent apartment that an alarm event is occurring. Similarly, shared industrial spaces could carry the alert across inter-company physical boundaries. Train cars could carry an alert back to the engineer in the locomotive. Dense urban centers with shopping on lower levels and habitable dwellings above could also be interconnected in a self-networked alarm system. Transient military operations that do not have a permanent base, such as in wartime, would now have cost-effective, transportable, and simply installed alarm system protective coverage. This architecture/system can also be used for public area emergencies or threats such as terrorist or bio-terrorism events by pre-deploying a self-configuring alert network with appropriate sensors for the expected threat. This system also could be instantly deployed after a public area emergency event has occurred to ensure that the event area does not expand to other adjacent regions or other cities.

Last, this system could be a redundant path alarm network for pre-installed wired alarm systems. Industries and applications where timely alerting with high reliability (low rate of alarm equipment failure) and high availability (high rate of alarm network up-time) greatly improves safe operation thereby benefiting from the application of wholly redundant alarm systems.

BRIEF DESCRIPTION OF THE DRAWINGS

FIG. 7 illustrates, in block diagram form, the configuration of an installation of the present self-configuring emergency event alarm network, consisting of a plurality of self-configuring emergency event alarm network devices, in a plurality of residential dwellings; and FIG. 8 illustrates, in flow diagram form, the operation of the present self-configuring emergency event alarm network, consisting of a plurality of self-configuring emergency event alarm network devices, in generating alarm indications in response to the detection of a hazard condition in the dwelling.

DETAILED DESCRIPTION OF THE INVENTION

There are numerous hazards that can be threatening to the occupants of a dwelling, and autonomous alarm devices are available to detect the presence of a predetermined level, concentration, or intensity of the hazard and automatically generate an alarm indication, such as a loud sound, to alert the occupants in the vicinity of the alarm device of the presence of the hazard. The present self-configuring emergency event alarm network dynamically networks a set of individual alarm network devices as an ad hoc (or mesh) peer-to-peer architecture that are installed throughout a dwelling or the units of a multiple family dwelling using a self-configuring network. Each node in the network "finds" its proximate neighbor nodes, which then communicate in a like fashion to their proximate neighbor nodes until a network is formed with end-to-end connectivity in its entirety.

Prior Art Stand-Alone Alarm Devices

Figure 1:
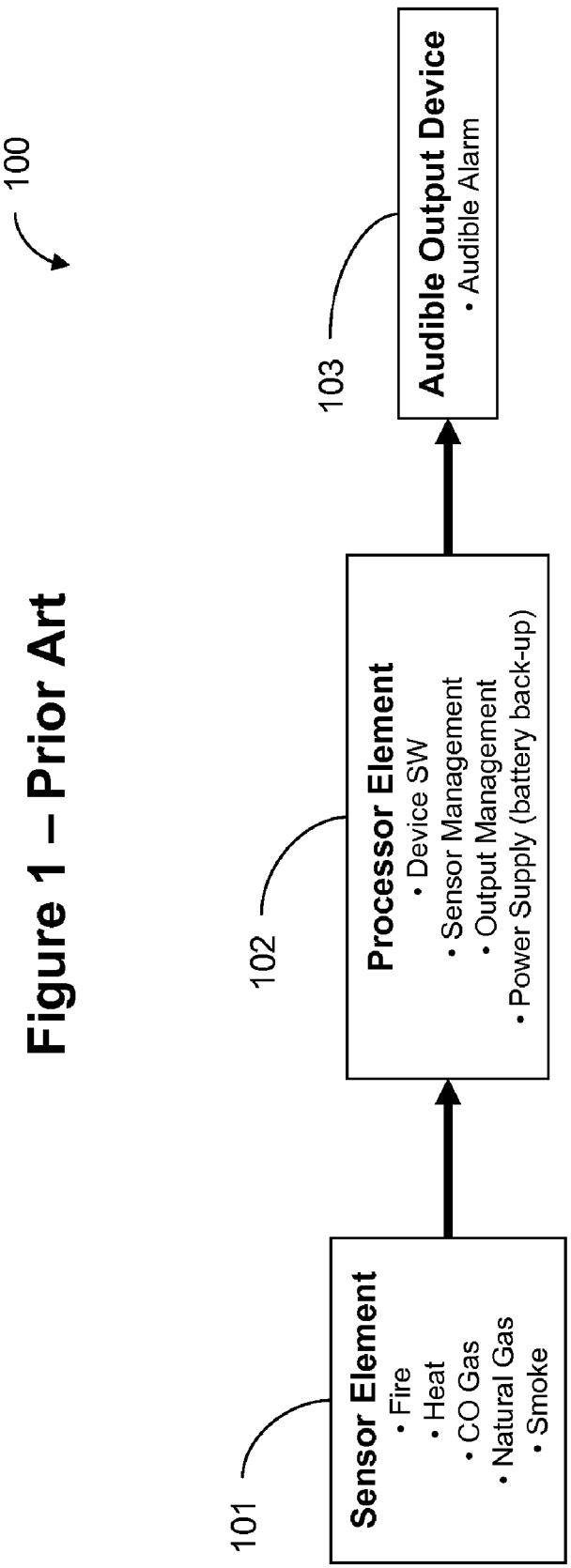
FIG. 1 illustrates, in block diagram form, the architecture of a prior art stand-alone alarm device.

FIG. 1 illustrates, in block diagram form, the architecture of a prior art stand-alone alarm device 100, which consists of a sensor element(s) 101, a processor element 102, and an audible output element 103. The sensor element 101 functions to detect the immediate presence of a hazard, which can be fire, heat, carbon monoxide gas, natural gas, smoke, bio-hazard, nuclear radiation, flood, water incursion, unauthorized entry, motion, infra-red, optical recognition, or other such life-endangering event. The sensor element 101 typically generates an output electrical signal indicative of the status of the monitored life-endangering event, either safe or unsafe. The processor element 102 includes the power source used to power the stand-alone alarm device 100 and a backup (where used) as well as the program-controlled device that executes the logic of the stand-alone alarm device 100. This logic is operable to monitor the output electrical signal received from the sensor element 101, the presence/absence of power, and functions to control the audible output element 103 based on the state of the sensor element 101. The audible output element 103 functions to generate an audible output of predetermined volume, duration, and pattern under control of the processor element 102 when the sensor element 101 indicates the presence of a hazard.

This stand-alone alarm device 100 is autonomous in its operation in that it fails to communicate with any device external to the stand-alone alarm device 100. In addition, the stand-alone alarm device 100 alarms only in a predetermined region, area, or volume that experiences the sensed life-endangering event.

Self-Configuring Emergency Event Alarm Network Device

Figure 2:
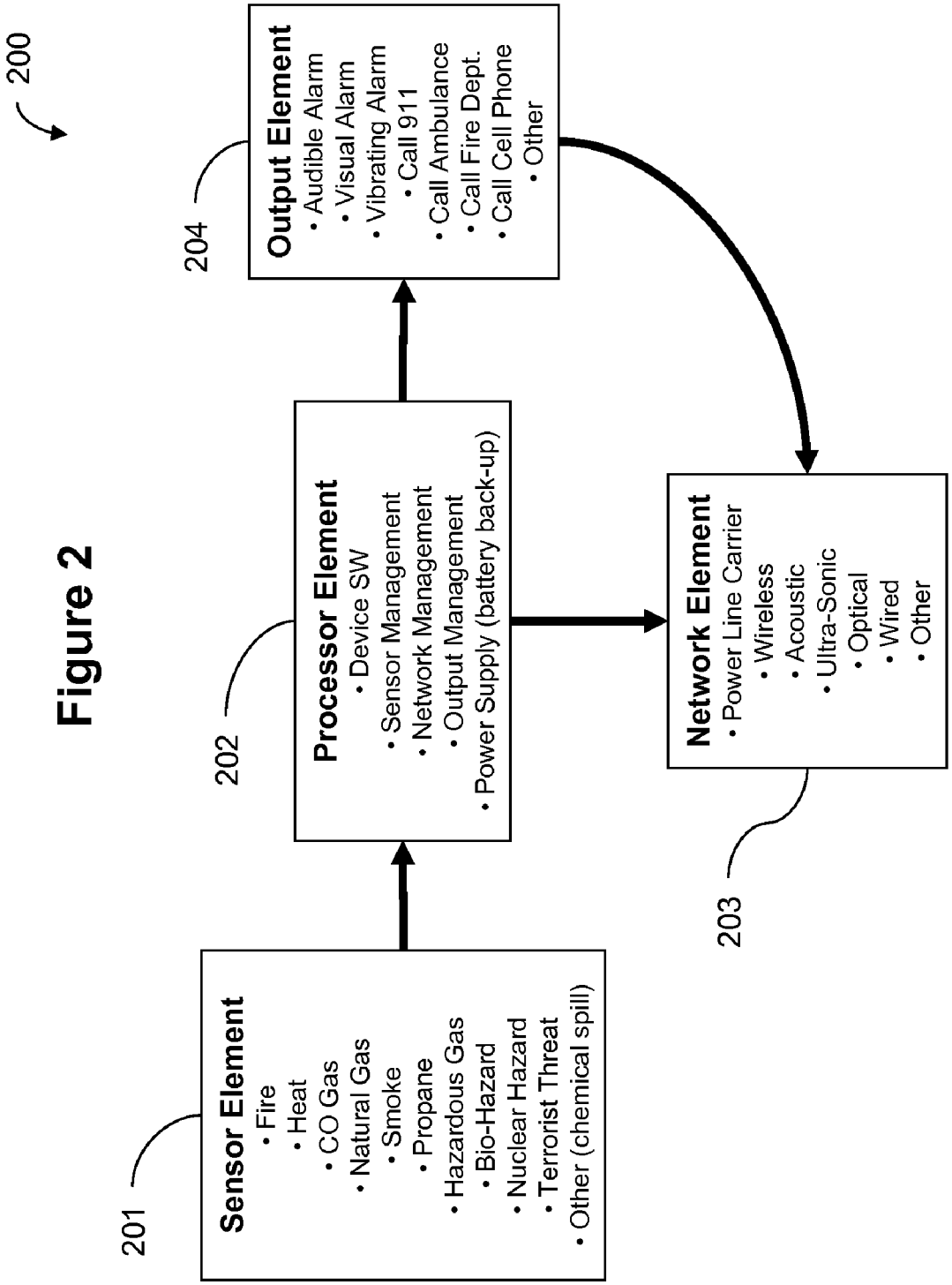
FIG. 2 illustrates, in block diagram form, the architecture of the present self-configuring emergency event alarm network device.

FIG. 2 illustrates, in block diagram form, the architecture of the present self-configuring emergency event alarm network device 200, which consists of sensor element(s) 201, processor element 202, network element 203, and output element 204. The sensor element 201 functions to detect the immediate presence of a hazard, which can be one or more of: fire, heat, carbon monoxide gas, natural gas, smoke, propane, hazardous gas, chemical, bio-hazard, nuclear hazard, or other such life-endangering event. The sensor element 201 typically generates an output electrical signal indicative of the status of the monitored life-endangering event, either safe or unsafe. The processor element 202 includes the power source used to power the self-configuring emergency event alarm network device 200 and a backup (where used), as well as the program controlled device that activates and executes the logic of the self-configuring emergency event alarm network device 200. This logic monitors the output electrical signal received from sensor element 201, the presence/absence of power, and functions to control alarm output element 204 and the network device 203 based on the state of the sensor element 201, as well as the network element 203 based on the presence of other self-configuring emergency event alarm network devices 200, as described below. The alarm output element 204 functions to generate one or more alarm indications under control of processor element 202 comprising: an audible output of predetermined volume, duration, and pattern, a visual indication, and/or external communication to an outside location.

Processor element 202 not only manages the sensor element(s) 201, but also manages the network element 203 to determine whether one or more other self-configuring emergency event alarm network devices are present within a self-determined communication range of the self-configuring emergency event alarm network device 200, as described below. In addition, the processor element 202 recognizes a unique identity that is assigned to this alarm network device 200, either prearranged in the factory, or set by the installer of the self-configuring emergency event alarm network. The assignment of a unique identity to alarm network devices simplifies the self-configuration process as described below, since each response to a communication is associated with a particular uniquely identified alarm network device, to thereby distinguish among a plurality of alarm network devices that may respond to a query.

Alarm element 204 generates one or more alarm indications comprising: an audible output of predetermined volume, duration, and pattern, a visual indication of predetermined intensity, duration, and pattern, and/or external communication to an outside location, such as an emergency response agency.

Network element 203 consists of a communication device which functions to establish a communication session with one or more other self-configuring emergency event alarm network devices 200 via a communication medium. The communication medium can be wire-line based or wireless or a combination of these technologies. The communication medium can be any of the known types, including: power line carrier, wireless (radio frequency), acoustic, ultra-sonic, optical, wired, or the like. The network element 203, when the self-configuring emergency event alarm network device 200 is installed and initiated, transmits a query over the available communication medium to detect the presence of any other self-configuring emergency event alarm network devices 200 that are connected to the communication medium. This is described below with respect to FIG. 4.

Thus, the self-configuring emergency event alarm network device 200 is capable of alerting the entire set of individual alarm devices of any alarm event, independent of where the alarm event occurred. The network of alarm devices, therefore, can spread the alarm indication to the entirety of the area covered by the network of alarm devices and also can differentiate between a general alarm indication and the locus of the alarm event.

Self-Configuring Emergency Event Alarm Network

Figure 3:
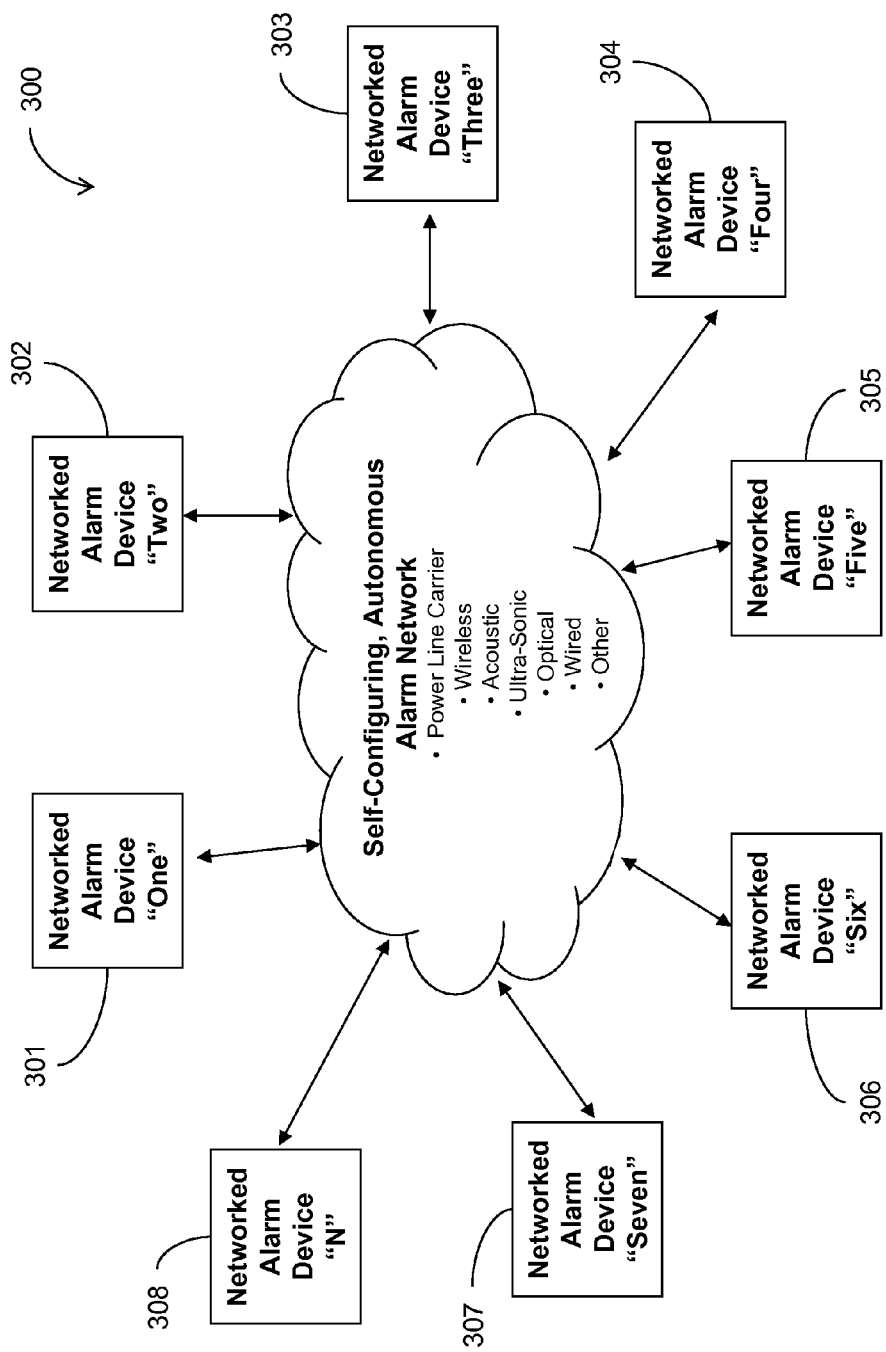
FIG. 3 illustrates, in block diagram form, the configuration of a typical installation of the present self-configuring emergency event alarm network, consisting of a plurality of self-configuring emergency event alarm network devices.

FIG. 3 illustrates, in block diagram form, the configuration of a typical installation of the present self-configuring emergency event alarm network, consisting of a plurality (N) of self-configuring emergency event alarm network devices. This self-configuring emergency event alarm network has a plurality of the following attributes:

1. Locate, identify, and communicate with adjacent alarm network devices (nodes).
2. Perform this network registration of alarm network devices in an autonomous, automatic manner.
3. Authenticate alarm network devices (nodes) on the network to ensure they are legitimate devices.
4. Establish regular "all is well" internal communications to verify network health.
5. Establish self-test algorithms in order to verify network functionality.
6. Be able to relay data from one alarm network device to the next if out of communication range.
7. Be able to alarm at multiple alarm network devices, even though an alarm event can be highly localized.
8. Be able to identify which alarm network device is the alarming one so emergency personnel can respond accordingly.
9. Be able to shut off non-event alarm network devices though user selection.
10. Be able to shut off event alarm network device(s) so that the event (fire, smoke, gas, other) can be more effectively managed.
11. Automatically alert fire, police, and ambulance to reduce response time.
12. Be able to quickly discern false alarms from real events.
13. Change tone-tenor of audible alarm output by the alarm network devices based on severity or threat of detected event (i.e., if it's a natural gas leak, have a specific alarm sound so that no one turns on a light switch).

Network Topologies

There are numerous network topologies that can be used to implement the self-configuring emergency event alarm network, and the following descriptions characterize a number of commonly used topologies. The description also characterizes a number of varieties of communication links that can be used to link the alarm network devices regardless of the network topology selected.

Point-to-point links are often referred to as a "wireless bridge" when wireless (such as Radio Frequency, optical, or acoustic—herein collectively termed "wireless") communication links are used and serve as a replacement for a single communication cable. Point-to-point links communicate reliably and when wireless links are used, as long as the two endpoints are located sufficiently close to one another to escape the effects of interference and path loss. A difficulty with this topology is that wired and power line communication links require the installation of the communication links.

Figure 6:
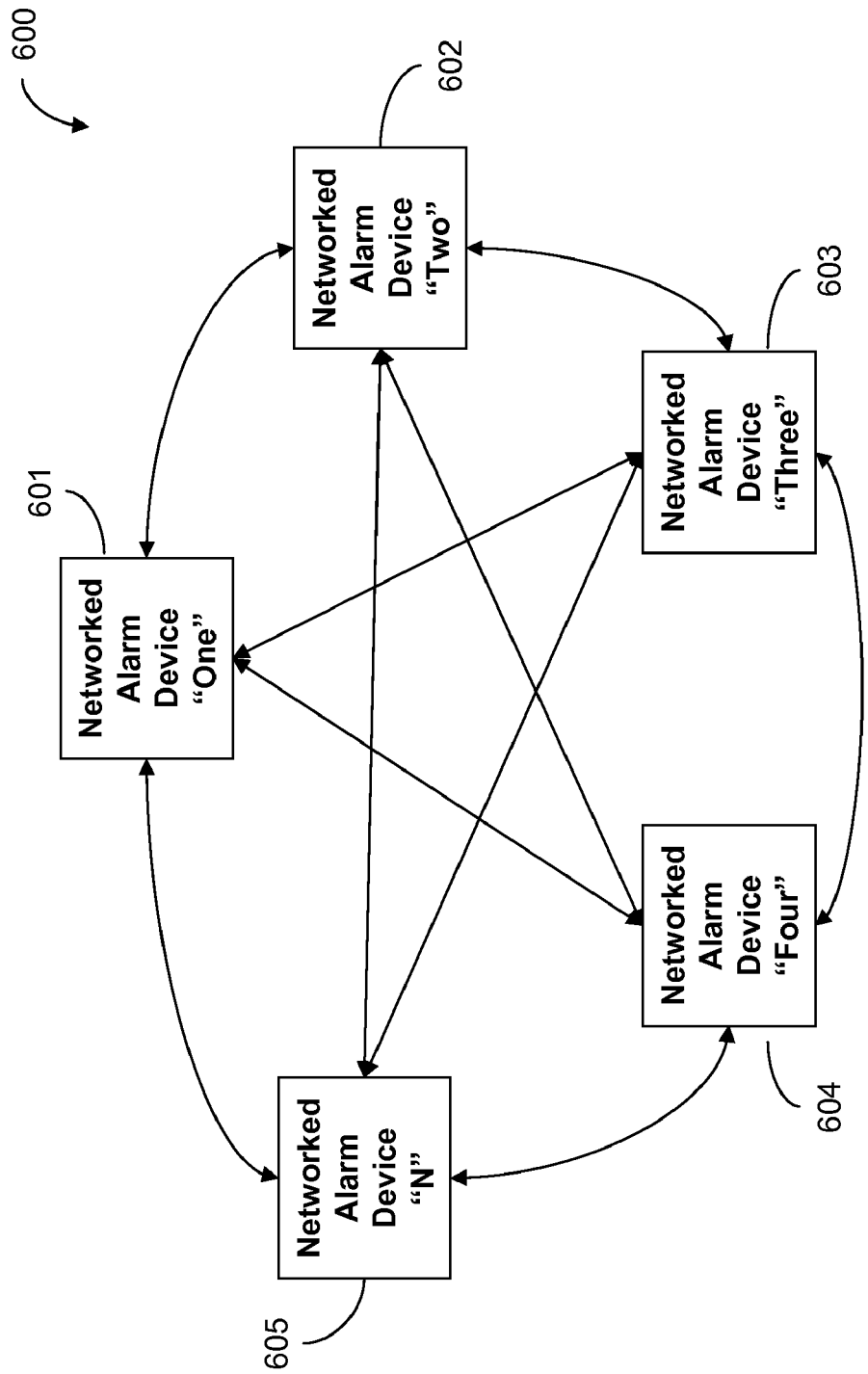
FIG. 6 illustrates, in block diagram form, the configuration of an alternative installation of the present self-configuring emergency event alarm network, consisting of a plurality of self-configuring emergency event alarm network devices, connected in a mesh network.

A mesh network is a local area network (LAN) that employs one of two connection arrangements: full mesh topology or partial mesh topology. In the full mesh topology, each alarm network device is connected directly to each of the others (as shown in FIG. 6). In the partial mesh topology, some alarm network devices are connected to all the others, but some of the alarm network devices are connected only to those other alarm network devices with which they exchange the most data. The mesh network topology is a peer-to-peer system where an alarm network device can send and receive messages, but each alarm network device also functions as a router and can relay messages for its neighbors. Through this relaying process, a packet of data finds its way to its ultimate destination, passing through intermediate alarm network devices with reliable communication links. If an alarm network device fails in this network, the messages are automatically routed through alternative paths.

A mesh network is self-configuring and does not require manual configuration. Also, it is inherently reliable and adaptable, since if one router fails, messages are sent via alternate paths to their destination. Therefore, there is a significant amount of redundancy in the transmission capability of the mesh network, and the network is indefinitely scalable.

A mesh network is reliable and offers redundancy. If one alarm network device can no longer operate, all the rest can still communicate with each other, directly or through one or more intermediate alarm network devices. Mesh networks work well when the alarm network devices are located at scattered points that do not lie near a common line.

The chief drawback of the mesh topology is communication link expense, because of the large number of cables and connections required when a wire-line communication link paradigm is selected. However, with power line communication links or wireless communication links, the expense of interconnection is eliminated.

A star network is a local area network (LAN) in which all alarm network devices are directly connected to a common central computer. Every alarm network device is indirectly connected to every other through the central computer. In some star networks, the central computer can also operate as an alarm network device. The star network topology works well when alarm network devices are at scattered points. It is easy to add or remove alarm network devices. In a star network, a cable failure isolates the alarm network device that it links to the central computer, but only that alarm network device is isolated. All the other alarm network devices continue to function normally, except that they are not able to communicate with the isolated alarm network device. If any alarm network device goes down, none of the other alarm network devices are affected. However, if the central computer goes down in a star network, the entire network suffers degraded performance or complete failure.

The communication links can be implemented using any of a number of technologies. As noted above, the communication links can either be "wired," using power line carriers, electrical conductors, and the like, or "wireless," such as Radio Frequency, optical, acoustic, and the like. Some of these choices are described below.

For a power line carrier communication link embodiment, the typical architecture of the commercial alternating current (AC) power distribution network for a premises is that a plurality of low voltage power line transformers function to reduce the medium voltage of the power transmission lines to a low voltage of typically 220 volts for residential or business use. The next tier in this distribution network is the distribution of the low voltage from the power line transformer through an electric meter and service entrance disconnect to the in-building electrical outlets. At the circuit breaker panel that serves the premises, all of the neutral conductors are connected to a common bus bar, thereby electrically interconnecting all neutral terminals of all electrical outlets in the premises. This forms a "wired network" of conductors and their associated power outlet terminals that are distributed throughout the premises (often at 120 volts). The insertion of the communication signals into this power distribution network can occur at any point and can be implemented by simply connecting to the power distribution network via an electrical plug. In order to channel data communications on the power distribution network to selected locations and subscribers, apparatus typically is used to limit the signal distribution. Some of the existing components of the power distribution network automatically perform this function, such as power line transformers noted above. If the distribution of the communication signals encompasses a wider extent, the power line transformers can be bypassed by a high frequency jumper to carry the communication signals between power distribution networks. In addition, where a direct power line connection extends both to sites to be served as well as sites not to be served, some high frequency signal blocking apparatus is preferably used to limit the distribution of the data communication signals to only those sites to be served (transformers often act as blocks to Power Line Carrier (PLC) signals since their high frequency impedance is very high incurring substantial loss of the PLC signals across the transformer).

The radio frequency communication link embodiment uses RF transceivers (transmitter and receiver) modules in the Alarm Device(s) to effect communication between the networked nodes. This RU communication could be at any frequency of operation, although it is generally performed at VHF/UHF or microwave frequencies. A typical frequency band of operation is the Part 15 unlicensed spectrum, since this does not require FCC operating permits. Part 15 band operation has both un-spread and spread spectrum communication signals. The spread spectrum signals have the advantage of being non-interfering to adjacent spread spectrum networks. The spreading could be accomplished in either the code or frequency domain. Network access typically uses a Carrier Sense (CS) algorithm before transmitting to avoid uncoordinated packet collisions. Coupled with Carrier Sense, the communication access often uses an Aloha scheme (random, slotted, and so on) to further improve the network efficiency and minimize the likelihood of packet collisions in the RU domain.

Network Self-Configuration

Figure 4:
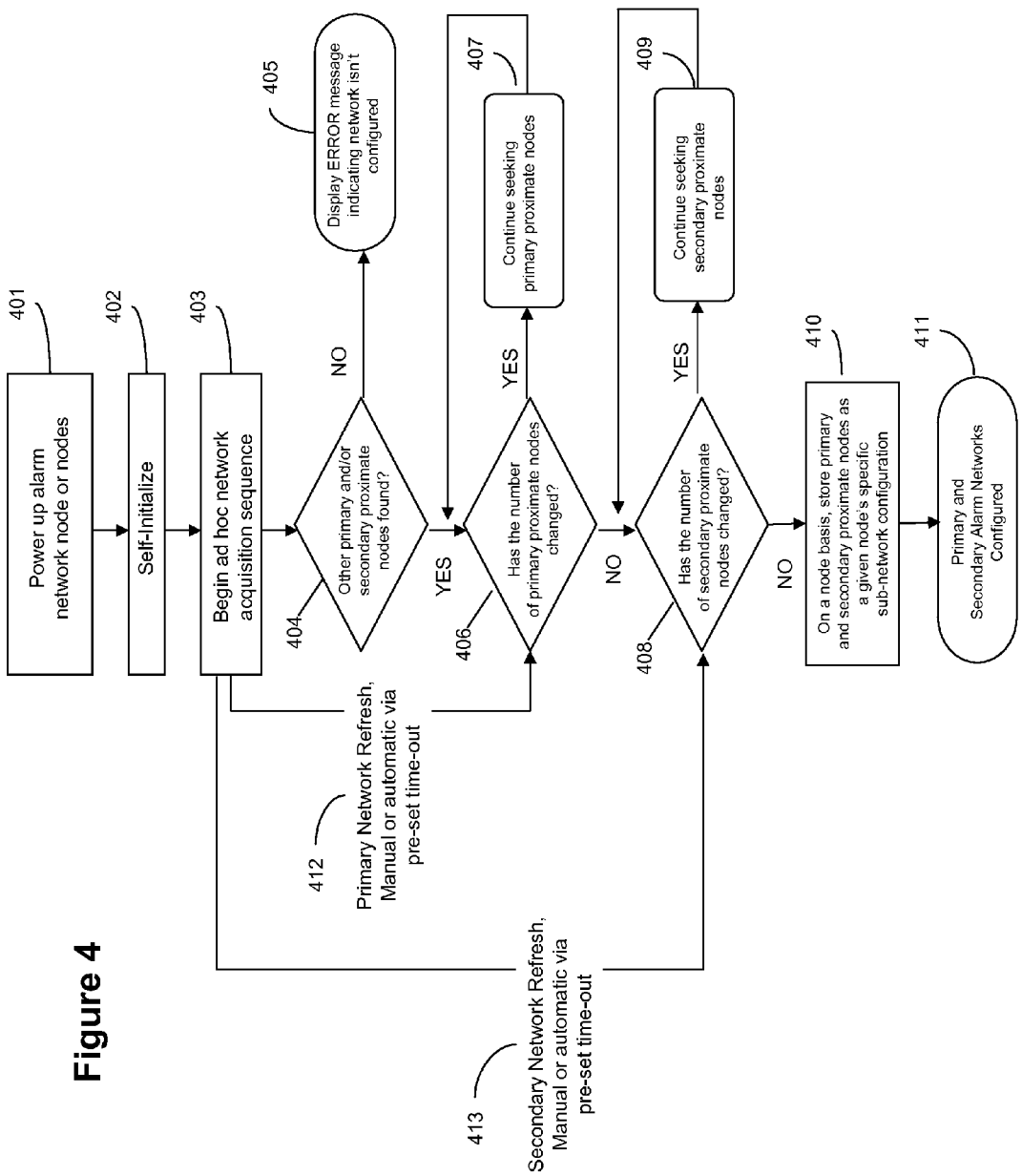
FIG. 4 illustrates, in flow diagram form, the operation of the present self-configuring emergency event alarm network, consisting of a plurality of self-configuring emergency event alarm network devices.

FIG. 4 illustrates, in flow diagram form, the operation of the present self-configuring emergency event alarm network, consisting of a plurality of self-configuring emergency event alarm network devices, such as is illustrated in FIG. 3. The alarm network devices initially are in a power down mode, where each alarm network device is not aware of other alarm devices located in proximity to the alarm network device. The alarm network devices can either be assembled prior to installation in the dwelling or installed in the dwelling and awaiting activation.

The alarm network is initialized when the plurality of alarm network devices 301-308 are powered up at step 401. Each alarm network device 301-308 enters step 402 where they self-initialize and proceed to activate the various elements 201-204 contained therein and verify the operational status of these elements 201-204. In addition, the alarm network devices 301-308 identify the communication medium 310 that is used to implement the alarm network communication backbone. Identification of the type of communication medium 310 used can be automatically detected, or may be manually set by the installer via a data input, such as a switch setting on the alarm network devices 301-308.

Once the alarm network devices 301-308 are operational, the installer advances to step 403 where one of the alarm network devices, for example-alarm network device 305, is advanced into the network self-configuration mode. This process entails the selected alarm network device 305 transmitting one or more messages over the communication medium 310 to establish communications with one or more of the remaining alarm network devices 301-304, 306-308. If, at step 404, the selected alarm network device 305 fails to locate any other alarm network devices, then this is an error condition, since the network must contain two or more alarm network devices. Therefore, processing advances to step 405 where an error indication is generated to indicate that the network configuration has failed. The failure to find a proximate device to communicate with could simply be that, for example, the homeowner, through a mistake, hasn't turned on any of the other network nodes. To manage this situation, and to ensure that the network has a process whereby it refreshes its configuration, step 412 provides a Primary Network Refresh in a manual or automatic means. The Primary Network defines the volume or spatial extent of the homeowner's dwelling, for example.

Otherwise, at step 406, the selected alarm network device 305 receives one or more responses to its transmitted query and stores the identity of the responding alarm network device(s) in its memory. If this responding alarm network device (304 for example) has not previously been detected by the selected alarm network device 305, then the number of primary proximate nodes has changed and processing advances to step 407 where processing returns to step 406 where the next responsive response (from alarm network device 306 for example) is received and analyzed as noted above. The steps 406-407 are repeated until all of responses received by selected alarm network device 305 have been processed. At this juncture, all of the alarm network devices that are proximate to the selected alarm network device 305 are identified and their identities stored in the memory of alarm network device 305. The identified alarm network devices that are proximate to and communicable with alarm network device 305 form alarm network device 305's sub-network within the composite mesh network 300. In a like manner, all individual alarm network devices 301-308 have their own sub-networks of alarm network devices which respectively communicable to themselves. This network configuration process continues in a like manner, serial or simultaneous in the time domain, for all alarm network devices 301-308 interconnected by communication network 310.

Processing then advances to step 408 where the selected alarm network device 305 receives one or more responses to its transmitted query from alarm network devices located in the Secondary Network, and stores the identity of the responding alarm network device(s) in memory. The Secondary Network, for example, could be a neighbor's home network (it being a Primary Network for the neighbor) where the adjacent neighbors have mutually agreed to have their individual Primary Networks interconnected. If this responding alarm network device (301 for example) has not previously been detected by the selected alarm network device 305, then the number of secondary proximate nodes has changed and processing advances to step 409 where processing returns to step 408 where the next responsive response (from alarm network device 302 for example) is received and analyzed as noted above. The steps 408-409 are repeated until all of the responses received by selected alarm network device 305 have been processed. At this juncture, all of the alarm network devices that are proximate to the selected alarm network device 305 and located in the secondary network are identified and their identities stored in the memory of alarm network device 305. If no Secondary Network devices are initially located, step 413 provides for manual or automatic self-configuration at a future time.

At step 410, the selected alarm network device 305 completes the network definition table stored in memory to identify the alarm network devices that are located in the primary sub-network and the secondary sub-network as seen from the selected alarm network device 305. Processing then advances to step 411 where the selected alarm network device 305 enters the alarm network configured state.

Each of the alarm network devices, other than the selected alarm network device 305, in response to receiving an initial query, activates itself to step 403 where it initiates the network self-configuration process. As part of this network self-configuration process, as alarm network device transmits and receives messages, each originating alarm network device receives queries from one or more other alarm network devices as these devices self-configure, and the receipt of such a query confirms that the initiation of the self-configuration or alarm process has been accomplished by the network.

Alarm Event in the Self-Configuring Emergency Event Alarm Network

FIG. 8 illustrates, in flow diagram form, the operation of the present self-configuring emergency event alarm network, consisting of a plurality of self-configuring emergency event alarm network devices, in generating alarm indications in response to the detection of a hazard condition in the dwelling.

In the event that a hazard condition is extant at step 801 in the dwelling protected by the self-configuring emergency event alarm network 300, at least one (305, for example) of the alarm network devices 301-308 detects the presence of the hazard condition at step 802. The sensor element 201 in the detecting alarm network device(s) 305 at step 802 generates an electrical signal indicative of the status of the monitored life-endangering event, which is received by processor element 202. The processor element 202 at step 803 interprets the received electrical signal and activates its network element 203 at step 804 to initiate communications with the alarm network devices (304, 306) contained in the sub-network associated with alarm network device 305. The processor element 203 creates a message that indicates the presence and nature of the hazard that is detected by the sensor element 201, and this message is propagated by the network element 203 to the alarm network devices 304, 306 that comprise the sub-network for alarm network device 305, as identified in the network self-configuration process described above. In addition, processor element 200 in alarm network device 305 activates the alarm output element 204 at step 805 to generate, for example, an audible alarm indication to alert the occupants of the dwelling of the presence of a hazard condition. The audible alarm indication typically would be of sufficient intensity and content to cause the occupants located in the vicinity of the alarm output element 204 to recognize the seriousness of the communication. The audible alarm would also typically be different than the audible alarm generated by the other alarm network devices 301-304, 306-308, so the occupants can discern the locus of the hazard condition simply by the difference in the audible alarms being generated.

The message, when received by the alarm network devices 304, 306 at step 806, cause the processor element 202 in those alarm network devices 304, 306 to interpret the message, identify the alarm nature of the communication, and then forward the received message to the alarm network devices in the respective sub-networks of those alarm network devices 304, 306 at step 807. In addition, processor element 200 in each of the alarm network devices 304, 306 activates their respective alarm output elements 204 at step 808 to generate, for example, an audible alarm indication to alert the occupants of the dwelling of the presence of a hazard condition. The audible alarm indication typically would be of sufficient intensity and content to cause the occupants located in the vicinity of the alarm output element 204 to recognize the seriousness of the communication. The audible alarm typically also would be different than the audible alarm generated by the alarm network device 305 that detected the hazard, so the occupants can discern the locus of the hazard condition simply by the difference in the audible alarms being generated.

As described above with respect to the propagation of network configuration information and the alarm indication from the detecting alarm network device, the alarm indication is automatically propagated among all of the alarm network devices 301-308 that are connected by the communication medium 310 by each alarm network device communicating with the members of its sub-network. In this manner, the alarm network devices 301-308 are cooperatively operative on a dynamic message propagation pattern to circulate the alarm indication. It is expected that at least one of the alarm network devices can also be connected to an external communication medium, such as the Public Switched Telephone Network, and the processor element 202 contained in that alarm network device can initiate a telephone call to an emergency response agency (such as fire department, police department, private security service, and the like) at step 809 to deliver a predetermined message that indicates the identity of the dwelling, the nature of the hazard condition, and the locus of the hazard condition in the dwelling. By providing locus-specific and hazard-specific information to the emergency response agency, their response can be targeted, thereby providing a more effective and timely response to deal with the detected hazard condition.

Network Bridging

Figure 5:
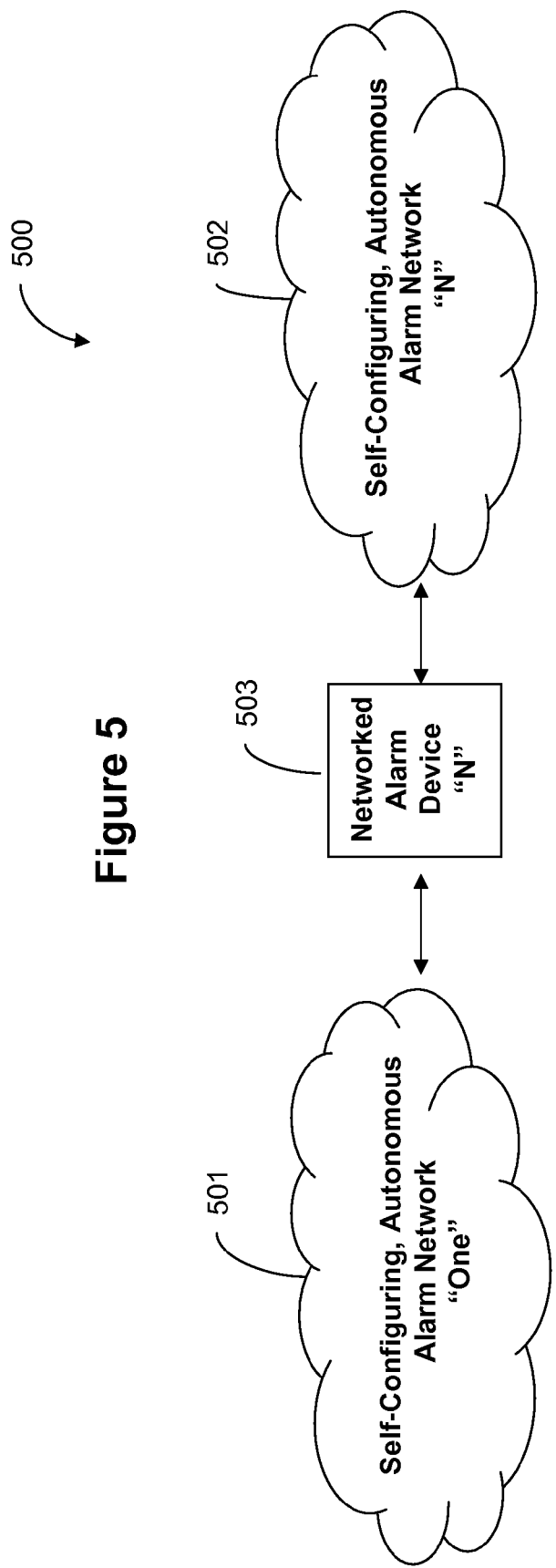
FIG. 5 illustrates, in block diagram form, the configuration of the present self-configuring emergency event alarm network which bridges two existing autonomous alarm networks.

FIG. 5 illustrates, in block diagram form, the configuration of one embodiment of the present self-configuring emergency event alarm network 400 which bridges two existing autonomous alarm networks. In this example, two self-configuring emergency event alarm networks 401, 402 operate in an autonomous manner. A bridging device 403 or a self-configuring emergency event alarm network device functions to establish communication sessions with both of the autonomous self-configuring emergency alarm networks 401, 402, thereby linking the two autonomous self-configuring emergency alarm networks 401, 402 into a coherent network.

The self-configuration of this network proceeds as noted above. Each Primary Network, 501 and 502, have composite network super-addresses that identify respective self-configuring emergency alarm networks 300's as being unique. There could be multiple Primary Networks inter-connected, with each inter-connected Primary Network being defined as a Secondary Network connection to a given Primary Network, as shown by 502 being defined as Network "N".

Mesh Network Connected Configuration

FIG. 6 illustrates, in block diagram form, the configuration of an alternative installation of the present self-configuring emergency event alarm network 600, consisting of a plurality of self-configuring emergency event alarm network devices 601-605, connected in a mesh network 600. Each self-configuring emergency event alarm network device 601-605 can communicate directly with any other self-configuring emergency event alarm network device 601-605 in the mesh network 600. The mesh network topology is a peer-to-peer system where an alarm network device can send and receive messages, but each alarm network device also functions as a router and can relay messages for its neighbors. Through this relaying process, a packet of data finds its way to its ultimate destination, passing through intermediate alarm network devices with reliable communication links. If an alarm network device fails in this network, the messages are automatically routed through alternative paths. It is possible for alarm network device 603 to be connected in a pure mesh topology, i.e., able to communicate with all other nodes directly (without relay), and for an alarm network device (not shown) to only be able to communicate directly with alarm network device 603 which acts as a "gateway" for the alarm network device not shown to communicate with all other nodes in the self-configuring emergency alarm network.

Residential Application—Self-Configuring Emergency Event Alarm Network

FIG. 7 illustrates, in block diagram form, the configuration of an installation of the present self-configuring emergency event alarm network, consisting of a plurality of self-configuring emergency event alarm network devices, in a plurality of residential dwellings.

In this application, a first dwelling 701 is equipped with a plurality of self-configuring emergency event alarm network devices, which are formed into a network as described above. The network functions as described above to alert the residents of the first dwelling of the presence of a hazard. However, in cases where the first dwelling 701 is unoccupied, the generation of an alarm indication is ineffective to initiate a response from residents of the first dwelling 701. Therefore, including a self-configuring emergency event alarm network device in an adjoining (second) dwelling 702 or dwellings (or other unit(s) in a multi-family dwelling) enables the alarm indication to be extended to one or more additional sets of residents who can respond to the presence of the alarm indication in the first dwelling 701. This alarm indication can be of a nature to indicate that the hazard is present in the other dwelling, so the occupants of the second dwelling are not confused about the nature of the alarm.

Summary

The self-configuring emergency event alarm network dynamically interconnects the alarm devices that are installed throughout a dwelling or the units of a multiple family dwelling using a self-configuring network. The network of alarm devices, therefore, can spread the alarm indication to the entirety of the area covered by the network of alarm devices and also can differentiate between a general alarm indication and the locus of the alarm event.

What is claimed as new and desired to be protected by Letters Patent of the United States is:

1. A self-configuring alarm network, installed in a premises, comprising:
  a plurality of alarm network devices, each of which comprises:
    processor means for communicating with said plurality of alarm network devices to dynamically establish a network of said plurality of alarm network devices,
    at least one sensor means for detecting the presence of a hazard condition, and
    alarm means for generating at least one alarm indication in response to detection of said presence of a hazard condition,
    wherein said processor means is responsive to a hazard detected by said at least one sensor means for communicating via said network of said plurality of alarm network devices to relay said hazard detection to said plurality of alarm network devices.

2. The self-configuring alarm network of claim 1 wherein said sensor means of said alarm network devices comprises:
  at least one sensor for detecting at least one hazard from the class of life-endangering events comprising: fire, heat, carbon monoxide gas, natural gas, smoke, propane, chemical, hazardous gas, bio-hazard, nuclear radiation, flood, water incursion, unauthorized entry, motion, infra-red, and optical recognition.

3. The self-configuring alarm network of claim 1 wherein said sensor means of said alarm network devices comprises:
  means for detecting the presence of at least one of a predetermined level, concentration, and intensity of said hazard condition.

4. The self-configuring alarm network of claim 1 wherein said alarm means comprises:
   alarm indication generation means for generating at least one alarm indication comprising one of: an audible output of predetermined volume, duration, and pattern, a visual indication of predetermined intensity, duration, and pattern, and external communication to an outside location.

5. The self-configuring alarm network of claim 1 wherein said alarm means comprises:
   alarm indication generation means capable of generating at least two alarm indications comprising: a first alarm indication indicating that said sensor means has detected said hazard condition, and a second alarm indication indicating receipt of a communication indicative of said hazard detection from another of said plurality of alarm network devices.

6. The self-configuring alarm network of claim 5 wherein said processor means comprises:
   means, responsive to a hazard detected by said at least one sensor means, for activating said alarm means to generate said first alarm; and
   means, responsive to receipt of a communication indicative of said hazard detection from another of said plurality of alarm network devices, for activating said alarm means to generate said second alarm.

7. The self-configuring alarm network of claim 1 wherein said network means establishes a communication session with one or more other of said plurality of alarm network devices via a communication medium.

8. The self-configuring alarm network of claim 1 wherein said processor means comprises:
   query means for detecting the presence of any other alarm network devices that are connected to said communication medium; and
   memory means for storing identities of said detected alarm network devices in memory to form a sub-network comprising said identified alarm network devices.

9. The self-configuring alarm network of claim 8 wherein said processor means further comprises:
   relay means, responsive to receipt of a communication for detecting the presence of any other alarm network devices that are connected to said communication medium, for activating said query means to detect the presence of any other alarm network devices that are connected to said communication medium.

10. The self-configuring alarm network of claim 8 wherein said processor means further comprises:
    alert transmission means, responsive to a hazard detected by said at least one sensor means, for transmitting an alert indication to said sub-network comprising said identified alarm network devices.

11. The self-configuring alarm network of claim 10 wherein said processor means further comprises:
    relay means, responsive to receipt of an alert indication from any other alarm network devices that are connected to said communication medium, for activating said alert transmission means to transmit an alert indication to said sub-network comprising said identified alarm network devices.

12. The self-configuring alarm network of claim 1 wherein said set of communication links comprises at least one of communication medium modes including: power line carrier, radio frequency, acoustic, ultra-sonic, optical, and wired.

13. The self-configuring alarm network of claim 1 wherein said network comprises an interconnection of said plurality of alarm network devices using a network topology selected from the class of network topologies including: full mesh, partial mesh, partial mesh connected to partial mesh, linear, partial mesh connected to linear, partial mesh connected to star.

14. A method of self-configuring an alarm network, which is installed in a premises, comprising: installing a plurality of alarm network devices; and
    operating each of said alarm network devices to execute the steps of:
    communicating with said plurality of alarm network devices to dynamically establish a network of said plurality of alarm network devices,
    detecting, using at least one sensor element, the presence of a hazard condition,
    generating one or more alarm indications in response to said detected hazard condition, and
    communicating with said plurality of alarm network devices to relay said hazard detection to said plurality of alarm network devices.

15. The method of self-configuring an alarm network of claim 14 wherein said step of detecting comprises:
    sensing at least one hazard from the class of life-endangering events comprising: fire, heat, carbon monoxide gas, natural gas, smoke, propane, chemical, hazardous gas, bio-hazard, nuclear radiation, flood, water incursion, unauthorized entry, motion, infra-red, and optical recognition.

16. The method of self-configuring an alarm network of claim 14 wherein said step of detecting comprises:
    sensing the presence of at least one of a predetermined level, concentration, and intensity of said hazard condition.

17. The method of self-configuring an alarm network of claim 14 wherein said step of generating comprises:
    generating at least one alarm indication comprising one of: an audible output of predetermined volume, duration, and pattern, a visual indication of predetermined intensity, duration, and pattern, and external communication to an outside location.

18. The method of self-configuring an alarm network of claim 14 wherein said step of generating comprises:
    generating at least two alarm indications comprising: a first alarm indication indicating that said step of sensing has detected said hazard condition, and a second alarm indication indicating receipt of a communication indicative of said hazard detection from another of said plurality of alarm network devices.

19. The method of self-configuring an alarm network of claim 18 wherein said step of communicating comprises:
    activating, in response to a hazard detected by said at least one sensor means, said step of generating to generate said first alarm; and
    activating, in response to receipt of a communication indicative of said hazard detection from another of said plurality of alarm network devices, said step of generating to generate said second alarm.

20. The method of self-configuring an alarm network of claim 14 wherein said step of establishing a communication session establishes a communication session with one or more other of said plurality of alarm network devices via a communication medium.

21. The method of self-configuring an alarm network of claim 14 wherein said step of communicating comprises:
    detecting the presence of any other alarm network devices that are connected to said communication medium; and storing identities of said detected alarm network devices in memory to form a sub-network comprising said identified alarm network devices.

22. The method of self-configuring an alarm network of claim 21 wherein said step of communicating further comprises:
activating, in response to receipt of a communication for the presence of any other alarm network devices that are connected to said communication medium, said step of detecting to detect the presence of any other alarm network devices that are connected to said communication medium.

23. The method of self-configuring an alarm network of claim 21 wherein said step of communicating further comprises:
transmitting, in response to a hazard detected by said step of detecting, an alert indication to said sub-network comprising said identified alarm network devices.

24. The method of self-configuring an alarm network of claim 23 wherein said step of communicating further comprises:
activating, in response to receipt of an alert indication from any other alarm network devices that are connected to said communication medium, said step of transmitting to transmit an alert indication to said sub-network comprising said identified alarm network devices.

25. The method of self-configuring an alarm network of claim 14 wherein said set of communication links comprises at least one of communication medium modes including: power line carrier, radio frequency, acoustic, ultra-sonic, optical, and wired.

26. The method of self-configuring an alarm network of claim 14 wherein said network comprises an interconnection of said plurality of alarm network devices using a network topology selected from the class of network topologies including: full mesh, partial mesh, partial mesh connected to partial mesh, linear, partial mesh connected to linear, partial mesh connected to star.

27. A self-configuring alarm network, comprising a plurality of cooperatively operative alarm network devices installed in a premises, wherein each of said alarm network devices comprises:
network means for exchanging messages with one or more of said plurality of alarm network devices;
processor means for communicating with at least one of said plurality of alarm network devices via said network means to establish a network of said plurality of alarm network devices;
at least one sensor means for detecting the presence of a hazard;
alarm means for generating one or more human sensible alarm indications in response to detection of said presence of a hazard condition; and
wherein said processor means is responsive to a hazard detected by said at least one sensor means for communicating with at least one of said plurality of alarm network devices to relay said hazard detection to said at least one of said plurality of alarm network devices.

28. The self-configuring alarm network of claim 27 wherein said sensor means of said alarm network devices comprises:
at least one sensor for detecting at least one hazard from the class of life-endangering events comprising: fire, heat, carbon monoxide gas, natural gas, smoke, propane, chemical, hazardous gas, bio-hazard, nuclear radiation, flood water incursion, unauthorized entry, motion, infrared, and optical recognition.

29. The self-configuring alarm network of claim 27 wherein said sensor means of said alarm network devices comprises:
means for detecting the presence of at least one of a predetermined level, concentration, and intensity of said hazard condition.

30. The self-configuring alarm network of claim 27 wherein said alarm means comprises:
alarm indication generation means for generating at least one alarm indication comprising one of: an audible output of predetermined volume, duration, and pattern, a visual indication of predetermined intensity, duration, and pattern, and external communication to an outside location.

31. The self-configuring alarm network of claim 27 wherein said alarm means comprises:
alarm indication generation means capable of generating at least two alarm indications comprising: a first alarm indication indicating that said sensor means has detected said hazard condition, and a second alarm indication indicating receipt of a communication indicative of said hazard detection from another of said plurality of alarm network devices.

32. The self-configuring alarm network of claim 31 wherein said processor means comprises:
means, responsive to a hazard detected by said at least one sensor means, for activating said alarm means to generate said first alarm; and
means, responsive to receipt of a communication indicative of said hazard detection from another of said plurality of alarm network devices, for activating said alarm means to generate said second alarm.

33. The self-configuring alarm network of claim 27 wherein said network means establishes a communication session with one or more other of said plurality of alarm network devices via a communication medium.

34. The self-configuring alarm network of claim 27 wherein said processor means comprises:
query means for detecting the presence of any other alarm network devices that are connected to said communication medium; and
memory means for storing identities of said detected alarm network devices in memory to form a sub-network comprising said identified alarm network devices.

35. The self-configuring alarm network of claim 34 wherein said processor means further comprises:
relay means, responsive to receipt of a communication for detecting the presence of any other alarm network devices that are connected to said communication medium, for activating said query means to detect the presence of any other alarm network devices that are connected to said communication medium.

36. The self-configuring alarm network of claim 34 wherein said processor means further comprises:
alert transmission means, responsive to a hazard detected by said at least one sensor means, for transmitting an alert indication to said sub-network comprising said identified alarm network devices.

37. The self-configuring alarm network of claim 36 wherein said processor means further comprises:
relay means, responsive to receipt of an alert indication from any other alarm network devices that are connected to said communication medium, for activating said alert transmission means to transmit an alert indication to said sub-network comprising said identified alarm network devices.

38. The self-configuring alarm network of claim 27 wherein said set of communication links comprises at least one of communication medium modes including: power line carrier, radio frequency, acoustic, ultra-sonic, optical, and wired.

39. The self-configuring alarm network of claim 27 wherein said network comprises an interconnection of said plurality of alarm network devices using a network topology selected from the class of network topologies including: full mesh, partial mesh, partial mesh connected to partial mesh, linear, partial mesh connected to linear, partial mesh connected to star.

40. A method of self-configuring an alarm network comprising a plurality of cooperatively operative alarm network devices which are installed in a premises, comprising the steps of:
   exchanging messages with one or more of said plurality of alarm network devices via a communication medium;
   communicating with at least one of said plurality of alarm network devices via said communication medium to establish a network of said plurality of alarm network devices;
   detecting the presence of a hazard using at least one sensor;
   generating, in response to a hazard detected by said at least one sensor, one or more human sensible alarm indications; and
   communicating with at least one of said plurality of alarm network devices to relay said hazard detection to said at least one of said plurality of alarm network devices.

41. The method of self-configuring an alarm network of claim 40 wherein said step of detecting comprises:
   sensing at least one hazard from the class of life-endangering events comprising: fire, heat, carbon monoxide gas, natural gas, smoke, propane, chemical, hazardous gas, bio-hazard, nuclear radiation, flood, water incursion, unauthorized entry, motion, infra-red, and optical recognition.

42. The method of self-configuring an alarm network of claim 40 wherein said step of detecting comprises:
   sensing the presence of at least one of a predetermined level, concentration, and intensity of said hazard condition.

43. The method of self-configuring an alarm network of claim 40 wherein said step of generating one or more alarm indications comprises:
   generating at least one alarm indication comprising one of: an audible output of predetermined volume, duration, and pattern, a visual indication of predetermined intensity, duration, and pattern, and external communication to an outside location.

44. The method of self-configuring an alarm network of claim 40 wherein said step of generating comprises:
   generating at least two alarm indications comprising: a first alarm indication indicating that said step of sensing has detected said hazard condition, and a second alarm indication indicating receipt of a communication indicative of said hazard detection from another of said plurality of alarm network devices.

45. The method of self-configuring an alarm network of claim 44 wherein said step of communicating comprises:
   activating, in response to a hazard detected by said at least one sensor means, said step of generating to generate said first alarm; and
   activating, in response to receipt of a communication indicative of said hazard detection from another of said plurality of alarm network devices, said step of generating to generate said second alarm.

46. The method of self-configuring an alarm network of claim 40 wherein said step of establishing a communication session establishes a communication session with one or more other of said plurality of alarm network devices via a communication medium.

47. The method of self-configuring an alarm network of claim 40 wherein said step of communicating comprises:
   detecting the presence of any other alarm network devices that are connected to said communication medium; and
   storing identities of said detected alarm network devices in memory to form a sub-network comprising said identified alarm network devices.

48. The method of self-configuring an alarm network of claim 47 wherein said step of communicating further comprises:
   activating, in response to receipt of a communication for the presence of any other alarm network devices that are connected to said communication medium, said step of detecting to detect the presence of any other alarm network devices that are connected to said communication medium.

49. The method of self-configuring an alarm network of claim 48 wherein said step of communicating further comprises:
   transmitting, in response to a hazard detected by said step of detecting, an alert indication to said sub-network comprising said identified alarm network devices.

50. The method of self-configuring an alarm network of claim 49 wherein said step of communicating further comprises:
   activating, in response to receipt of an alert indication from any other alarm network devices that are connected to said communication medium, said step of transmitting to transmit an alert indication to said sub-network comprising said identified alarm network devices.

51. The method of self-configuring an alarm network of claim 40 wherein said set of communication links comprises at least one of communication medium modes including: power line carrier, radio frequency, acoustic, ultra-sonic, optical, and wired.

52. The method of self-configuring an alarm network of claim 40 wherein said network comprises an interconnection of said plurality of alarm network devices using a network topology selected from the class of network topologies including: full mesh, partial mesh, partial mesh connected to partial mesh, linear, partial mesh connected to linear, partial mesh connected to star.

* * * * *